A. DRESHER.
AUTOMOBILE WHEEL ATTACHMENT.
APPLICATION FILED MAY 19, 1917.
1,264,028. Patented Apr. 23, 1918.
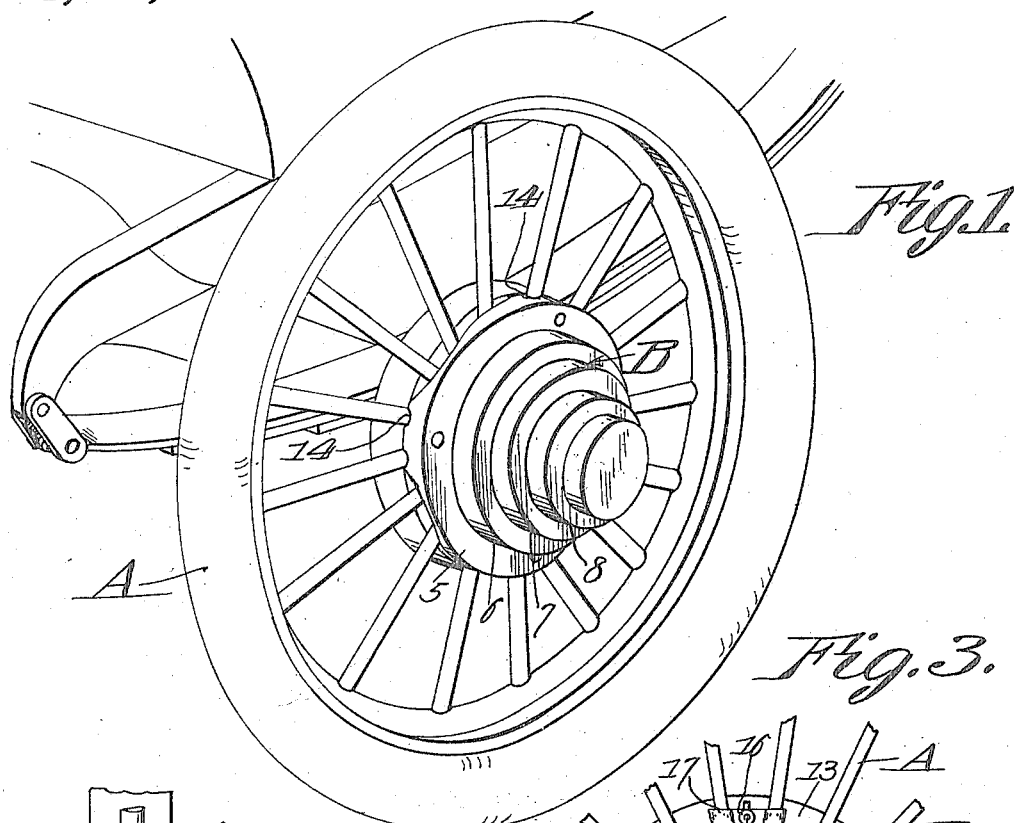
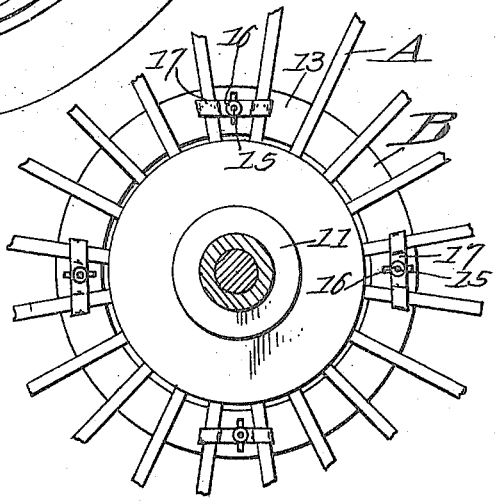
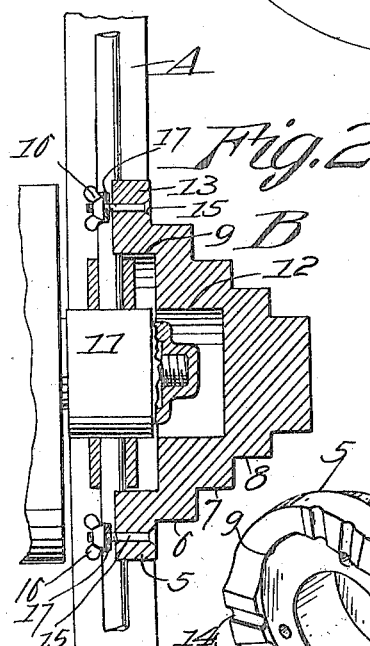
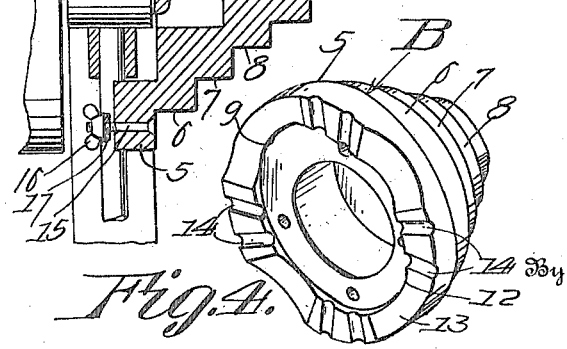
Inventor
Andrew Dresher,
By Talbert & Parker
Attorneys

UNITED STATES PATENT OFFICE.

ANDREW DRESHER, OF WAPAKONETA, OHIO.

AUTOMOBILE-WHEEL ATTACHMENT.

1,264,028. Specification of Letters Patent. Patented Apr. 23, 1918.

Application filed May 19, 1917. Serial No. 169,642.

*To all whom it may concern:*

Be it known that I, ANDREW DRESHER, a citizen of the United States, residing at Wapakoneta, in the county of Auglaize and State of Ohio, have invented certain useful Improvements in Automobile-Wheel Attachments, of which the following is a specification, reference being had therein to the accompanying drawing.

The invention relates to an automobile wheel attachment and more particularly to the class of cone pulley attachments for wheels.

The primary object of the invention is the provision of an attachment of this character wherein the same is constructed for the mounting thereof upon one of the rear wheels of an automobile so that motion from the latter can be utilized for transmitting power through a belt or the like to machinery for the driving of the same, the attachment being of novel form to permit the mounting of the same upon and its removal from the wheel with despatch.

Another object of the invention is the provision of an attachment of this character which is simple in construction, thoroughly reliable and efficient in its purpose, strong, durable and inexpensive in manufacture.

With these and other objects in view the invention consists in the features of construction, combination and arrangement of parts as will be hereinafter fully described, illustrated in the accompanying drawing and pointed out in the claims hereunto appended.

In the accompanying drawing:

Figure 1 is a fragmentary perspective view of an automobile showing the rear wheel with the pulley attachment constructed in accordance with the invention, applied;

Fig. 2 is an enlarged vertical transverse sectional view through the wheel and pulley attachment;

Fig. 3 is a plan view looking toward the inner side of the wheel with the pulley attachment thereon;

Fig. 4 is a perspective view of the attachment removed from the wheel and looking toward its inner side.

Fig. 5 is a perspective view of one of the clamping members.

Similar reference characters indicate corresponding parts throughout the several views in the drawing.

Referring to the drawing in detail A designates generally one of the rear wheels of an automobile, particularly the Ford type and B the cone attachment hereinafter fully described.

The cone attachment B comprises a disk like base 5 having formed on one face a plurality of stepped annular portions 6, 7 and 8 respectively of different diameters so as to communicate varying speeds when a belt is applied to any one of the portions, while in the opposite inner face of said disk like base 5 is a counter-sink 9 which accommodates the outer spoke flange of the hub 11 of said wheel, the outer end of the hub 11 being projected into a recess 12 formed centrally in the disk-like base 5 and this counter-sink 9 provides a marginal wall 13 on the disk like base 5, the wall being notched at intervals in the free edge thereof to provide seats 14 in which are received the spokes of the wheel A.

Passed through the disk-like base 5 are bolt members 15 which are inserted between certain of the spokes 10 of the wheel A and have threaded thereon winged nuts 16 which work against clamps 17 which are adapted to bear against pairs of spokes adjacent each other at the inner side of the wheel and in this manner the attachment is securely fastened to the wheel yet said attachment can be readily removed therefrom with despatch should the occasion require.

The wall 13 on the disk-like base 5 with the notches or seats 14 therein engages the spokes of the wheel A so that the possibility of the turning of the attachment upon the wheel is entirely eliminated thereby avoiding any lost motion in the use of the attachment for driving a belt, it being understood of course that the rear wheel A of the automobile is driven from the motor and in the use of the attachment said automobile at its rear end is jacked to elevate the rear wheels from the ground or foundation so that motion imparted from the motor of the automobile to the rear wheel may be transmitted through a belt applied to the attachment to mchinery or the like for the driving of the same.

In the ordinary use of the automobile the attachment is removed from the rear wheel although its removal is not necessary.

From the foregoing it is thought that the construction and manner of operation of the device will be clearly understood and therefore a more extended explanation has been omitted.

Changes, variations and modifications may be made in the invention such as come properly within the scope of the appended claims without departing from the spirit of the invention or sacrificing any of its advantages.

What is claimed is:

1. The combination with a wheel, of a cone pulley attachment comprising a disk-like base having stepped annular portions on one face, and also having a counter-sink and recess in its opposite face, said counter-sink and recess being adapted to receive a portion of the hub and the outer spoke flange of said wheel, and means for detachably clamping said base to the spokes of the wheel.

2. The combination with a wheel, of a cone pulley attachment comprising a disk-like base having stepped annular portions on one face, and also having a counter-sink and recess in its opposite face, said counter-sink and recess being adapted to receive a portion of the hub and the outer spoke flange of said wheel, means for detachably clamping said base to the spokes of the wheel, and the wheel concentrically of the counter-sink in the base being formed with notches at intervals for seating the spokes.

3. The combination with a wheel, of a cone pulley attachment comprising a disk-like base having stepped annular portions on one face and also having a counter-sink and recess in its opposite face, said counter-sink and recess being adapted to receive a portion of the hub and the outer spoke flange of said wheel, bolt members passed through the base and having winged nuts threaded thereon, and clips engaged on the bolt members and adapted for engagement with the spokes of the wheel for the clamping of the base upon said wheel on the tightening of the nuts upon the bolts.

In testimony whereof I affix my signature.

ANDREW DRESHER.

Copies of this patent may be obtained for five cents each, by addressing the "Commissioner of Patents, Washington, D. C."